(12) United States Patent  (10) Patent No.: US 7,791,559 B2
Piasecki  (45) Date of Patent: Sep. 7, 2010

(54) SYSTEM AND METHOD FOR MULTIPLE DISPLAY SUPPORT IN REMOTE ACCESS SOFTWARE

(75) Inventor: Derek Piasecki, Goleta, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 631 days.

(21) Appl. No.: 11/532,087

(22) Filed: Sep. 14, 2006

(65) Prior Publication Data

US 2008/0068289 A1  Mar. 20, 2008

(51) Int. Cl.
*G09G 5/00* (2006.01)
(52) U.S. Cl. .......................... 345/1.1; 345/2.1; 715/769
(58) Field of Classification Search ................. 345/545, 345/531, 744, 553, 1.1, 1.2, 1.3, 2.1–2.3; 715/769
See application file for complete search history.

(56) References Cited

U.S. PATENT DOCUMENTS

| | | | |
|---|---|---|---|
| 4,807,029 | A | 2/1989 | Tanaka et al. |
| 4,893,307 | A | 1/1990 | McKay et al. |
| 4,928,247 | A | 5/1990 | Doyle et al. |
| 4,937,036 | A | 6/1990 | Beard et al. |
| 4,949,248 | A | 8/1990 | Caro |
| 4,965,819 | A | 10/1990 | Kannes |
| 4,974,173 | A | 11/1990 | Stefik et al. |
| 5,021,949 | A | 6/1991 | Morten et al. |
| 5,062,060 | A | 10/1991 | Kolnick et al. |
| 5,072,412 | A | 12/1991 | Henderson, Jr. et al. |
| 5,241,625 | A | 8/1993 | Epard et al. |
| 5,263,134 | A | 11/1993 | Paal et al. |
| 5,382,972 | A | 1/1995 | Kannes |
| 5,408,655 | A | 4/1995 | Oren et al. |
| 5,437,025 | A | 7/1995 | Bale et al. |

(Continued)

FOREIGN PATENT DOCUMENTS

EP  0475581  3/1992

(Continued)

OTHER PUBLICATIONS

"Remote Desktop Environments Reflected in Local Windows" IBM Technical Disclosure Bulletin, Mar. 1993, vol. 36, Issue 3, pp. 421-426.

(Continued)

*Primary Examiner*—Amare Mengistu
*Assistant Examiner*—Insa Sadio
(74) *Attorney, Agent, or Firm*—Goodwin Procter LLP

(57) ABSTRACT

A method of supporting multiple display configurations in a remote access environment, the remote access environment having a host computing device in communication with a viewer computing device comprises: receiving from a host computing device, by a viewer computing device having one or more viewer displays, a list of rectangles, each rectangle representing the boundaries of one of a plurality of host displays; presenting, by the viewer computing device to an end-user of the viewer computing device, a graphical user interface including means for selecting a configuration for displaying a window representing screen data of the plurality of host displays in the viewable area of the one or more displays of the viewer computing device; and displaying in the selected configuration, by the viewer computing device, the window representing the screen data of the one or more host displays. Corresponding systems are also described.

22 Claims, 9 Drawing Sheets

U.S. PATENT DOCUMENTS

| | | |
|---|---|---|
| 5,572,643 A | 11/1996 | Judson |
| 5,577,188 A | 11/1996 | Zhu |
| 5,619,638 A | 4/1997 | Duggan et al. |
| 5,757,925 A | 5/1998 | Faybishenko |
| 5,758,110 A | 5/1998 | Boss et al. |
| 5,761,656 A | 6/1998 | Ben-Shachar |
| 5,768,614 A | 6/1998 | Takagi et al. |
| 5,802,206 A | 9/1998 | Marold et al. |
| 5,835,090 A | 11/1998 | Clark et al. |
| 5,838,300 A | 11/1998 | Takagi et al. |
| 5,838,906 A | 11/1998 | Doyle et al. |
| 5,886,707 A | 3/1999 | Berg |
| 5,896,500 A | 4/1999 | Ludwig et al. |
| 5,909,559 A | 6/1999 | So |
| 5,935,212 A | 8/1999 | Kalajan et al. |
| 5,968,132 A | 10/1999 | Tokunaga et al. |
| 5,983,190 A | 11/1999 | Trower, II et al. |
| 5,990,852 A | 11/1999 | Szamrej |
| 5,999,525 A | 12/1999 | Krishnaswamy et al. |
| 6,006,242 A | 12/1999 | Poole et al. |
| 6,052,120 A | 4/2000 | Nahi et al. |
| 6,081,623 A | 6/2000 | Bloomfield et al. |
| 6,157,935 A | 12/2000 | Tran et al. |
| 6,166,729 A | 12/2000 | Acosta et al. |
| 6,199,753 B1 | 3/2001 | Tracy et al. |
| 6,202,060 B1 | 3/2001 | Tran |
| 6,233,617 B1 | 5/2001 | Rothwein et al. |
| 6,263,363 B1 | 7/2001 | Rosenblatt et al. |
| 6,317,761 B1 | 11/2001 | Landsman et al. |
| 6,366,933 B1 | 4/2002 | Ball et al. |
| 6,400,996 B1 | 6/2002 | Hoffberg et al. |
| 6,483,515 B1 * | 11/2002 | Hanko ................. 345/545 |
| 6,539,429 B2 | 3/2003 | Rakavy et al. |
| 6,584,493 B1 | 6/2003 | Butler |
| 6,601,087 B1 | 7/2003 | Zhu et al. |
| 6,640,145 B2 | 10/2003 | Hoffberg et al. |
| 6,658,464 B2 | 12/2003 | Reisman |
| 6,687,745 B1 | 2/2004 | Franco et al. |
| 6,710,753 B2 | 3/2004 | Gillespie et al. |
| 6,735,601 B1 | 5/2004 | Subrahmanyam |
| RE38,609 E | 10/2004 | Chen et al. |
| 6,850,252 B1 | 2/2005 | Hoffberg |
| 6,917,348 B2 | 7/2005 | Demsky et al. |
| 6,920,502 B2 | 7/2005 | Araujo et al. |
| 6,967,972 B1 | 11/2005 | Volftsun et al. |
| 7,006,881 B1 | 2/2006 | Hoffberg et al. |
| 7,035,907 B1 | 4/2006 | Decasper et al. |
| 7,076,736 B2 | 7/2006 | Hugh |
| 7,080,127 B1 | 7/2006 | Hickman et al. |
| 7,098,868 B2 | 8/2006 | Love et al. |
| 7,100,069 B1 | 8/2006 | Hickman et al. |
| 7,116,894 B1 | 10/2006 | Chatterton |
| 7,176,943 B2 | 2/2007 | Meyers et al. |
| 7,197,234 B1 | 3/2007 | Chatterton |
| 2001/0047406 A1 | 11/2001 | Araujo et al. |
| 2002/0016827 A1 | 2/2002 | McCabe et al. |
| 2002/0029285 A1 | 3/2002 | Collins |
| 2002/0032725 A1 | 3/2002 | Araujo et al. |
| 2002/0149617 A1 | 10/2002 | Becker |
| 2003/0055896 A1 | 3/2003 | Hu et al. |
| 2003/0093466 A1 * | 5/2003 | Jarman et al. ................. 709/203 |
| 2003/0191799 A1 | 10/2003 | Araujo et al. |
| 2003/0208529 A1 | 11/2003 | Pendyala et al. |
| 2004/0002048 A1 | 1/2004 | Thurmaier et al. |
| 2004/0017394 A1 | 1/2004 | Adachi |
| 2004/0046787 A1 * | 3/2004 | Henry et al. ................. 345/744 |
| 2004/0268357 A1 | 12/2004 | Joy et al. |
| 2004/0268358 A1 | 12/2004 | Darling et al. |
| 2005/0046637 A1 | 3/2005 | Mondal |
| 2005/0210118 A1 | 9/2005 | Hickman et al. |
| 2005/0286466 A1 | 12/2005 | Tagg et al. |
| 2006/0028479 A1 * | 2/2006 | Chun et al. ................. 345/531 |
| 2006/0282520 A1 | 12/2006 | Hickman et al. |
| 2007/0159491 A1 * | 7/2007 | Panabaker et al. .......... 345/553 |

FOREIGN PATENT DOCUMENTS

| | | |
|---|---|---|
| EP | 0645695 | 3/1995 |
| EP | 1469382 | 10/2004 |
| GB | 2327836 | 2/1999 |

OTHER PUBLICATIONS

International Search Report for corresponding International Application No. PCT/US2007/021098, mailed Feb. 22, 2008, 4 pages.

Written Opinion for corresponding International Application No. PCT/US2007/021098, mailed Feb. 22, 2008, 5 pages.

* cited by examiner

SYSTEM AND METHOD FOR MULTIPLE DISPLAY SUPPORT IN REMOTE ACCESS SOFTWARE

FIELD OF THE INVENTION

The present invention relates to remote access software allowing a user to display and access contents of a remote computing device, and, in particular, to allowing users of remote access software to efficiently display and navigate graphical information corresponding to a plurality of host displays by allowing a user to select one or more host displays and easily transition between host displays.

BACKGROUND OF THE INVENTION

Existing remote access software provides capabilities for a viewer at a remote computer to interact with a host computer in a way that simulates the experience of a viewer sitting at the host computer. However, difficulties may arise when a host computer has multiple displays. If the viewer computer has a different number of displays, or displays of different sizes or configurations, the viewer may have difficulty navigating the graphical information received from the host computer. While the user may be able to alter the graphical settings of the host computer via the remote access software, this may involve significant effort and may have the undesirable result of potentially disrupting the user's existing settings.

Thus there exists a need for remote access software which supports multiple display configurations, and successfully handles instances where a viewer computer and a host computer have different numbers or types of displays.

SUMMARY OF THE INVENTION

In one aspect, the present invention is a method of supporting multiple display configurations in a remote access environment, the remote access environment having a host computing device in communication with a plurality of host displays and a viewer computing device in communication with one or more viewer displays, the host computing device and viewer computing device in communication via a network is shown. In brief overview, the method comprises: receiving from a host computing device, by a viewer computing device having one or more viewer displays, a list of rectangles, each rectangle representing the boundaries of one of a plurality of host displays; presenting, by the viewer computing device to an end-user of the viewer computing device, a graphical user interface including means for selecting a configuration for displaying a window representing screen data of the plurality of host displays in the viewable area of the one or more displays of the viewer computing device; and displaying in the selected configuration, by the viewer computing device, the window representing the screen data of the one or more host displays. The method may further comprise determining a host display is not currently shown in the window; displaying an indicator at an edge of the window, wherein the indicator provides an indication as to the direction of the host display that is not currently shown; and transitioning to the indicated display upon activation of the graphical indicator.

In another aspect, the present invention is a computer implemented system for supporting multiple display configurations in a remote access environment, the remote access environment having a host computing device in communication with a plurality of host displays and a viewer computing device in communication with one or more viewer displays, the host computing device and viewer computing device in communication via a network. The system comprises: a viewer computing device having one or more viewer displays, the viewer computing device comprising: a transceiver which receives, from a host computing device, a list of rectangles, each rectangle representing the boundaries of one of a plurality of host displays; and one or more viewer displays which displays a graphical user interface including means for selecting a configuration for displaying a window representing screen data of the plurality of host displays in the viewable area of the one or more displays of the viewer computing device; and displays in the selected configuration the window representing the screen data of the one or more host displays.

BRIEF DESCRIPTION OF THE DRAWINGS

The foregoing and other objects, aspects, features, and advantages of the invention will become more apparent and better understood by referring to the following description taken in conjunction with the accompanying drawings, in which.

Figure 1:
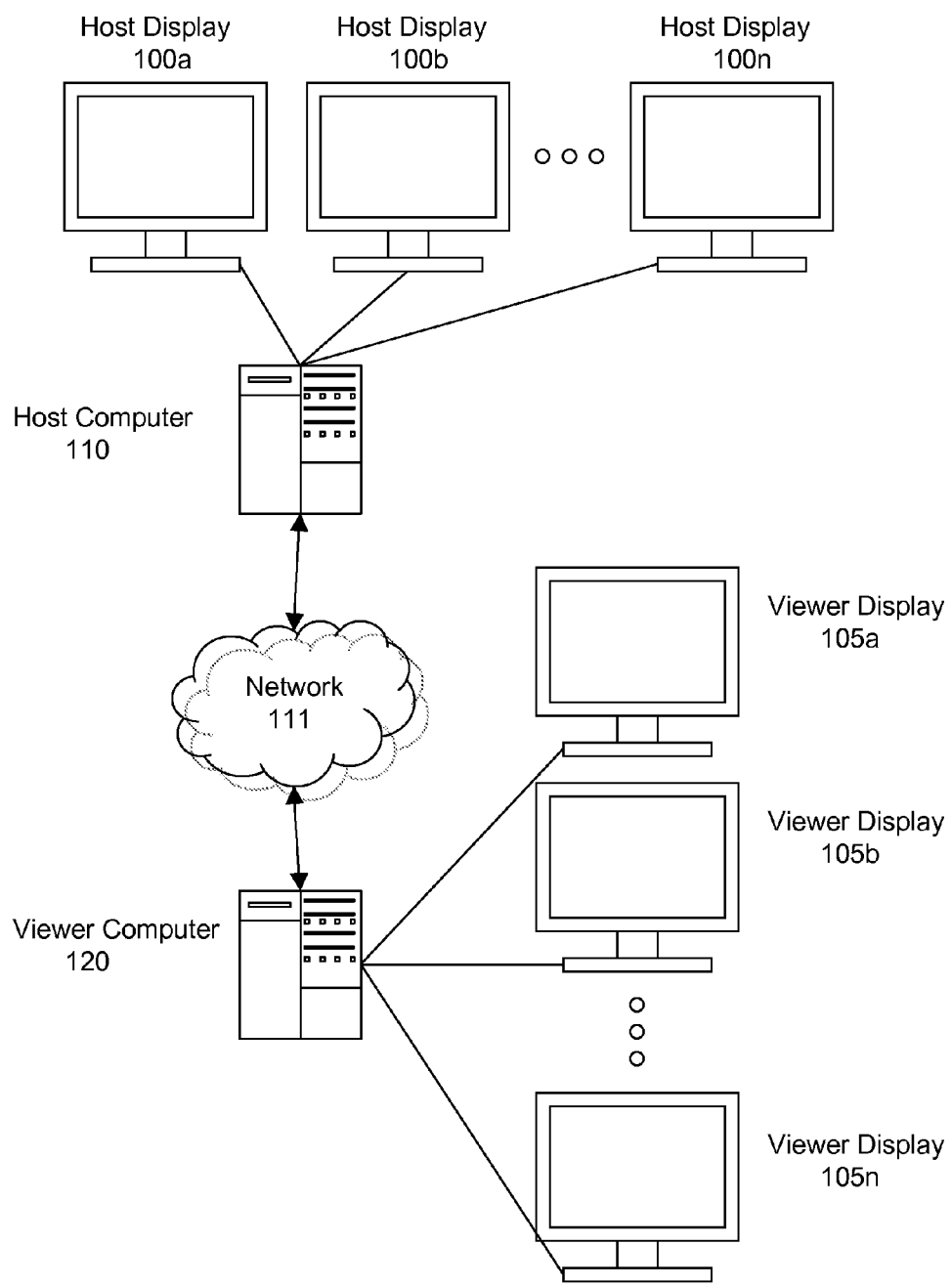
FIG. 1 is a block diagram of a network supporting multiple display configurations in a remote access environment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

Referring now to FIG. 1, a block diagram of a network supporting multiple display configurations in a remote access environment is shown. In brief overview, a host computer 110 is connected to a number of host displays 100a, 100b, ... 100n (generally 100). The host computer is connected via a network 111 to a viewer computer 120. The viewer computer in turn has a number of viewer displays 105a, 105b, ... 105n (generally 105). The viewer computer 120 may have the same number of displays 105 as the host computer 110, or the view computer may have more or fewer displays. The viewer computer 120 may receive and display screen data corresponding to the host computer 110 and one or more host displays 100.

The network 111 can be a personal area network (PAN), local-area network (LAN), a medium-area network (MAN), or a wide area network (WAN) such as the Internet or the World Wide Web. The network 111 may comprise any connections including standard telephone lines, LAN or WAN links (e.g., T1, T3, 56 kb, X.25), broadband connections (e.g., ISDN, Frame Relay, ATM), and wireless connections (e.g., IEEE 802.11 and Bluetooth). The viewer computer 120 may communicate with the host 110 through the network 111 using any communication protocol, including without limitation TCP/IP, IPX, SPX, NetBIOS, NetBEUI, SONET, SDH, and direct asynchronous protocols. The protocols used to communicate through the network 111 can include any variety of protocols used for long haul or short transmission. The network 111 may comprise mobile telephone networks utilizing any protocol or protocols used to communicate among mobile devices, including AMPS, TDMA, CDMA, GSM, GPRS or UMTS. The network 111 may comprise the Internet. As used herein, Internet refers to the electronic communications network that connects computer networks and organizational computer facilities around the world.

The viewer computer 120 can be any personal computer, server, Windows-based terminal, Network Computer, wireless device, information appliance, RISC Power PC, X-device, workstation, minicomputer, personal digital assistant (PDA), main frame computer, cellular telephone or other computing device that provides sufficient faculties to execute viewer software and an operating system. Viewer software of the invention facilitates displaying a representation of a screen display of the host computing device 110 and provides a facility to configure the representation to encompass the display of one or more host displays 105. As used herein, data refers to any digital representation of information. Examples of data include, but are not limited to files, folders, e-mails, instant messages (IM), audio files, video files, profiles, drivers, programs, and other electronic embodiments of information. The viewer computer 120 may also be referred to as the viewer 120, or the viewer computing device 120.

The host computer 110 can be any type of computing device that is capable of communication with the viewer 110. For example, the host computing device 110 can be any of the computing devices that are viewer computing devices. In addition, the host computing device 110 can be any other computing device that provides sufficient faculties to execute host software and an operating system. The host software of the invention provides a facility to transmit a representation of host screen data to a viewer computer. The host computer 110 may also be referred to as the host 110, or the host computing device 110.

The viewer computer 120 and host 110 can communicate directly with each other or through an intermediary computing or communication device. For example, in some embodiments a communication server may facilitate communications between the viewer 120 and the host 110. The communications server can provide a secure channel using any number of encryption schemes to provide communications between the viewer 120 and the host 110. One remote access product that currently uses such a communication scheme is GOTOMYPC offered by Citrix Online, LLC of Santa Barbara Calif. Certain aspects and features of the invention described below can be embodied in such a service. Other services that can include features of the invention can include, but are not limited too, CITRIX METAFRAME, provided by Citrix Systems, Inc. of Ft. Lauderdale Fla., WEBEX PCNOW offered by WebEx Communications, Inc. of Santa Clara Calif., LOGMEIN offered by 3 am Labs, Inc. of Woburn, Mass., REMOTELY ANYWHERE also offered by 3 am Labs, and PROVISION MANAGEMENT FRAMEWORK offered by Provision Networks.

The host and viewer displays may comprise any device capable of displaying graphical data. Examples of host or viewer displays may include computer monitors, LCD screens, CRTs, televisions, and projectors. The host and viewer displays may be any resolution, including without limitation CGA, VGA, SVGA, SXGA+, UGA, XGA, XVGA, QVGA, UXGA, QSXGA, QUXGA, WXGA, SXGA, WSXGA, WUXGA, and QSXGA. In some embodiments, a host or viewer computer may use specialized hardware such as a graphics card to communicate with the respective displays.

Figure 2A:
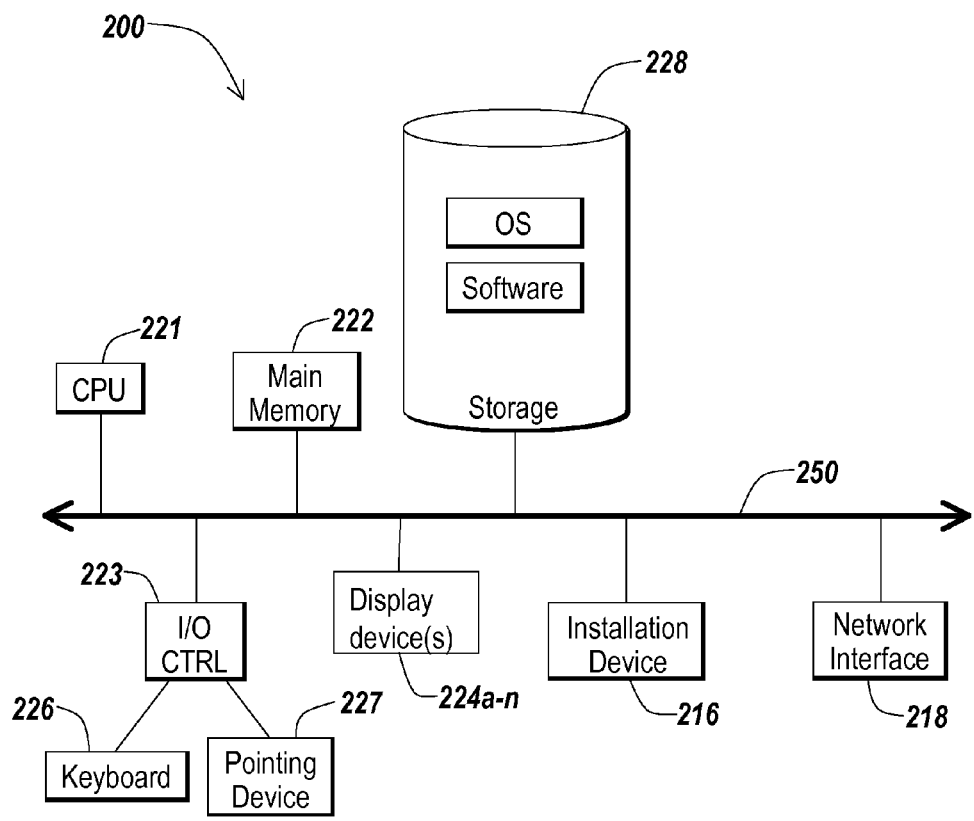
FIGS. 2A and 2B depict block diagrams of a typical computer useful as host computing devices and viewer computing devices.
Figure 2B:
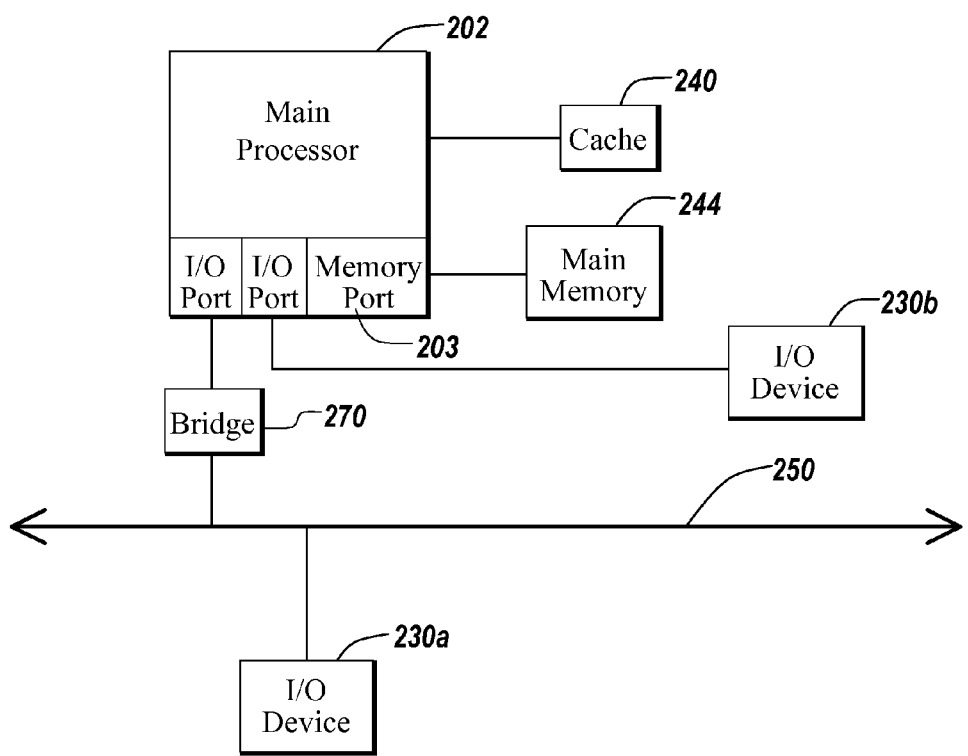

FIGS. 2A and 2B depict block diagrams of a typical computer 200 useful as host computing devices and viewer computing devices. As shown in FIGS. 2A and 2B, each computer 200 includes a central processing unit 202, and a main memory unit 204. Each computer 200 may also include other optional elements, such as one or more input/output devices 230a-230-b (generally referred to using reference numeral 230), and a cache memory 240 in communication with the central processing unit 202.

The central processing unit 202 is any logic circuitry that responds to and processes instructions fetched from the main memory unit 204. In many embodiments, the central processing unit is provided by a microprocessor unit, such as those manufactured by Intel Corporation of Mountain View, Calif.; those manufactured by Motorola Corporation of Schaumburg, Ill.; the Crusoe and Efficeon lines of processors manufactured by Transmeta Corporation of Santa Clara, Calif.; the lines of processors manufactured by International Business Machines of White Plains, N.Y.; or the lines of processors manufactured by Advanced Micro Devices of Sunnyvale, Calif.

Main memory unit 204 may be one or more memory chips capable of storing data and allowing any storage location to be directly accessed by the microprocessor 202, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). In the embodiment shown in FIG. 2A, the processor 202 communicates with main memory 204 via a system bus 250 (described in more detail below). FIG. 2B depicts an embodiment of a computer system 200 in which the processor communicates directly with main memory 204 via a memory port. For example, in FIG. 2B the main memory 204 may be DRDRAM.

FIGS. 2A and 2B depict embodiments in which the main processor 202 communicates directly with cache memory 240 via a secondary bus, sometimes referred to as a "backside" bus. In other embodiments, the main processor 202 communicates with cache memory 240 using the system bus 250. Cache memory 240 typically has a faster response time than main memory 204 and is typically provided by SRAM, BSRAM, or EDRAM.

In the embodiment shown in FIG. 2A, the processor 202 communicates with various I/O devices 230 via a local system bus 250. Various busses may be used to connect the central processing unit 202 to the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is an video display, the processor 202 may use an Advanced Graphics Port (AGP) to communicate with the display. FIG. 2B depicts an embodiment of a computer system 200 in which the main processor 202 communicates directly with I/O device 230*b* via HyperTransport, Rapid I/O, or InfiniBand. FIG. 2B also depicts an embodiment in which local busses and direct communication are mixed: the processor 202 communicates with I/O device 230*a* using a local interconnect bus while communicating with I/O device 230*b* directly.

A wide variety of I/O devices 230 may be present in the computer system 200. Input devices include keyboards, mice, trackpads, trackballs, cameras, video cameras, microphones, and drawing tablets. Output devices include video displays, speakers, inkjet printers, laser printers, and dye-sublimation printers. An I/O device may also provide mass storage for the computer system 800 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif.

In further embodiments, an I/O device 230 may be a bridge between the system bus 250 and an external communication bus, such as a USB bus, an Apple Desktop Bus, an RS-132 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose computers of the sort depicted in FIG. 2A and FIG. 2B typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

For embodiments comprising mobile devices, the device may be a JAVA-enabled cellular telephone, such as the i55sr, i58sr, i85s, or the i88s, all of which are manufactured by Motorola Corp. of Schaumburg, Ill.; the 6035 or the 7135, manufactured by Kyocera of Kyoto, Japan; or the i300 or i330, manufactured by Samsung Electronics Co., Ltd., of Seoul, Korea. In other embodiments comprising mobile devices, a mobile device may be a personal digital assistant (PDA) operating under control of the PalmOS operating system, such as the Tungsten W, the VII, the VIIx, the i705, all of which are manufactured by palmOne, Inc. of Milpitas, Calif. In further embodiments, the client 113 may be a personal digital assistant (PDA) operating under control of the PocketPC operating system, such as the iPAQ 4155, iPAQ 5555, iPAQ 1945, iPAQ 2215, and iPAQ 4255, all of which manufactured by Hewlett-Packard Corporation of Palo Alto, Calif.; the ViewSonic V36, manufactured by ViewSonic of Walnut, Calif.; or the Toshiba PocketPC e405, manufactured by Toshiba America, Inc. of New York, N.Y. In still other embodiments, the mobile device is a combination PDA/telephone device such as the Treo 180, Treo 270, Treo 600, Treo 650, Treo 700, or the Treo 700w, all of which are manufactured by palmOne, Inc. of Milpitas, Calif. In still further embodiments, the mobile device is a cellular telephone that operates under control of the PocketPC operating system, such as the MPx200, manufactured by Motorola Corp. A typical mobile device may comprise many of the elements described above in FIGS. 2A and 2B, including the processor 202 and the main memory 204.

Figure 3A:
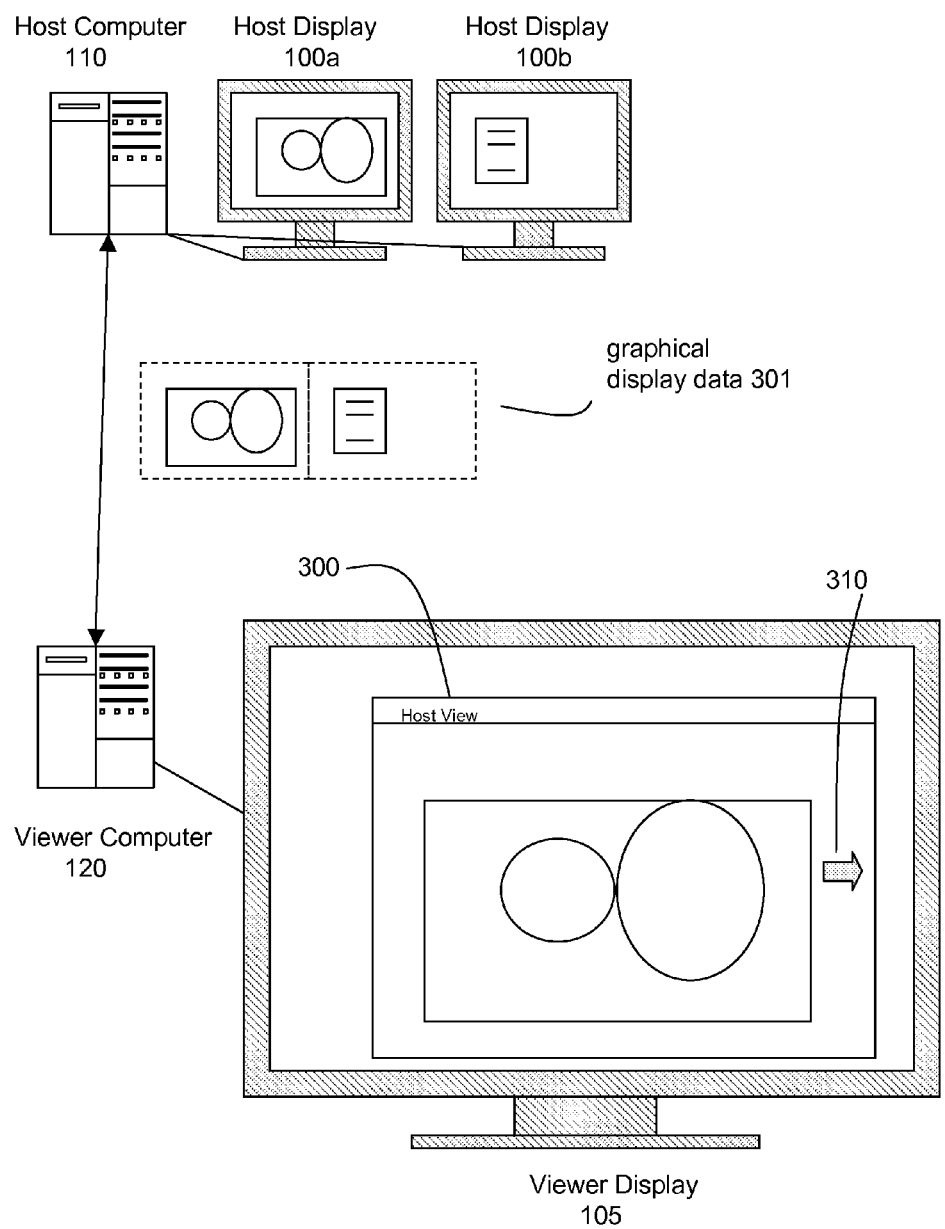
FIG. 3A is a block diagram of one embodiment of a remote access system providing functionality for viewing screen data from multiple monitors.

Referring now to FIG. 3A, a block diagram of one embodiment of a remote access system providing functionality for viewing screen data from multiple monitors is shown. In brief overview, a host computer 110 transmits graphical display data corresponding to a plurality of host displays 100. The graphical display data 301 comprises a list of rectangles, each rectangle corresponding to a given host display 100. The graphical display data is received by a viewer computer, and some or all of the graphical display data is then displayed in a window on the viewer display 105.

Still referring to FIG. 3A, now in greater detail, a host computer 110 transmits graphical display data corresponding to a plurality of host displays 100. The graphical display data may correspond to any number of host displays, including without limitation 2 displays, 3 displays, 4 displays, 5 displays, 8 displays, 16 displays and 32 displays. The graphical display data comprises a representation of the graphical display as it would be shown on the host displays. In some embodiments, the host displays may not actually be displaying the corresponding graphical display data. For example, the host displays 100 may be turned off, or configured to be inactive in some circumstances where the host computer is transmitting the graphical display data to a viewer computer.

The graphical display data 301 may be transmitted using any technique, and via any network. The graphical display data may be compressed, translated, or otherwise modified for transmission. For example, commonly or repeatedly occurring icons or tiles may be cached on the viewer computer. Or for example, a data compression function may be used to reduce the size of the transmitted graphical display data.

In the embodiment shown, the graphical display data 301 comprises a list of rectangles 301. Each rectangle may correspond to a given host display. In some embodiments, a rectangle may correspond to a given portion of a host display. The rectangles may comprise any means for specifying the rectangular boundaries of a host display. In some embodiments, the list of rectangles may be transmitted as a single list of rectangles. In other embodiments, the list of rectangles may be transmitted as a series of lines or dimensions which serve to specify one or more rectangles. In some embodiments, the list of rectangles may be compressed using any data compression technique. In some embodiments, the host may only send the list of rectangles to the viewer once. In other embodiments the host may send the list of rectangles in response to a request from the viewer computer. In still other embodiments, the host may send the list of rectangles a plurality of times.

For example, a host computer may comprise two displays, each with a resolution of 800×600. The host may transmit graphical display data for the combined 1600×600 viewing area displayed by both host displays. The host may then transmit a list of two rectangles corresponding to the viewing areas of the respective displays, which in this example may comprise the rectangles: [(0,0)(0,599)(799,599)(799,0)] and [(800,0)(800,599)(1599,599)(1599,0)]. In other embodiments, this list of rectangles may be transmitted using other means for specifying the rectangles. For example, the host may transmit the coordinates of lines with the graphical display data which correspond to the separation between one or more monitors.

As a second example, a host computer may comprise three graphical displays, two with a resolution of 800×600 and one with a resolution of 1600×1000. The monitors may be arranged in a configuration such that the total viewing area is 1600×1600, with the two 800×600 monitors displaying the upper portions of the viewing area, and the 1600×1000 monitor displays the lower portion of the viewing area. The host may transmit graphical display data for the monitors, and transmit a list of rectangles corresponding to the viewing area of each display. In this example, the list may comprise the rectangles: [(0,0)(0,599)(799,599)(799,0)] and [(800,0)(800,599)(1599,599)(1599,0)] and [(0,600)(0,1599)(1599,1599)(1599,0)].

The viewer computer may then display some or all of the graphical display data. In one embodiment, the viewer computer displays some or all of the graphical display data in a dedicated window 300. In some embodiments, the dedicated window 300 may occupy the full screen of one or more viewer displays.

The dedicated window 300 may comprise any portion of the transmitted graphical display data. In one embodiment, the dedicated window may comprise a given subset of the graphical display data corresponding to the resolution of the dedicated window. For example, if the dedicated window 300 has a resolution of 400×300, the dedicated window may display a 400×300 area of the received graphical display data, which may be any resolution.

In some embodiments, the viewer may display a dedicated window 300 across more than one viewer display. For example, if the resolution of the received graphical display data is 1600×1000 and the viewer computer has two displays, each with 1200×800 resolution, the viewer computer may display a dedicated window comprising a 1400×700 area of the received graphical display data.

In one embodiment, the viewer computer may automatically determine a configuration for displaying the received graphical data on a plurality of viewer monitors. For example, the viewer may expand the display window first vertically and then horizontally such that the display window occupies the largest available rectangular area of the plurality of viewer displays.

In some embodiments, the dimensions of the received graphical display data may be larger than the dedicated window 300. In these embodiments, the dedicated window may provide a scrolling feature such that the user can navigate the dedicated window to display different areas of the received graphical display data. For example, if the user moves a mouse pointer near an edge of the window 300, the window may scroll in the direction of the edge to reveal additional areas of the received graphical data 301. Or, for example, the window may provide scroll bars or buttons for scrolling.

In some embodiments, a dedicated window may display the entirety of the received graphical display data corresponding to a given host display. In some embodiments, the user may select a subset of a plurality of host displays will be displayed in the dedicated window 300. In some embodiments this may be a result of the user selecting that particular host display 100a for viewing. In some embodiments, the dedicated window 300 may further provide functionality for the user to lock scrolling of the window. In still other embodiments, the window may automatically lock scrolling of the window if the viewer computer determines that an entire host display is represented in the window 300.

In some embodiments, a dedicated window 300 may comprise an indicator 310 which indicates the direction of a display not currently shown in the window. An indicator 310 may comprise any graphical indication, including an arrow, icon, graphical distortion, or thumbnail. For example, in one embodiment an indicator 310 may comprise an arrow of a given color overlaying a portion of the window. In a second example, an indicator may comprise a thumbnail of the display not currently shown. In another embodiment, an indicator 310 may comprise a graphical change in the window border, such as a highlighting of the border. In still another embodiment, an indicator 310 may comprise an icon or graphical representation displayed outside of the window. For example, a separate interface window may be displayed alongside the dedicated window 300 comprising indicators 310 and other navigation tools.

In some embodiments, a window 300 may comprise a plurality of indicators 310, indicating the direction of a plurality of host displays not currently shown. Indicators may indicate any direction corresponding to a host display not shown, including left, right, up, down, or diagonally. In some embodiments, an indicator 310 may also indicate distance. For example, a host computer may comprise three host displays, H1, H2, and H3, arranged left-to-right. If a window of a viewer computer is currently displaying graphical data corresponding to display H1, the window may comprise a first indicator pointing right indicating the direction of H2, such that if the user clicks the indicator the window will transition to displaying graphical data corresponding to H2. The window may also comprise a second indicator pointing right indicating the direction of H3, such that if the user clicks the indicator the window will transition to displaying graphical data corresponding to H3. The indicator corresponding to H3 may be displayed smaller, darker, or otherwise distinguished from the indicator corresponding to H2 in order to indicate to the user that the indicator corresponds to a host display not contiguous to the display currently shown.

In some embodiments, a user activating an indicator 310 may cause the window to transition to displaying the graphical data corresponding to the host display in the direction of the indicator. In one embodiment, a user may activate an indicator 310 by clicking on the indicator. In another embodiment, a user may activate an indicator by using a keyboard shortcut.

In FIG. 3A, the dedicated window 300 shows a representation of graphical data corresponding to the host display 100a. In the example shown, the indicator 310 indicates that the display of the host display 100b, which is not currently shown, exists to the right of the graphical data displayed in the window. If a user clicks on or otherwise activates the indicator 310, the dedicated window may transition to displaying the graphical data corresponding to the host display 100b, as is shown in FIG. 3B.

Figure 3B:
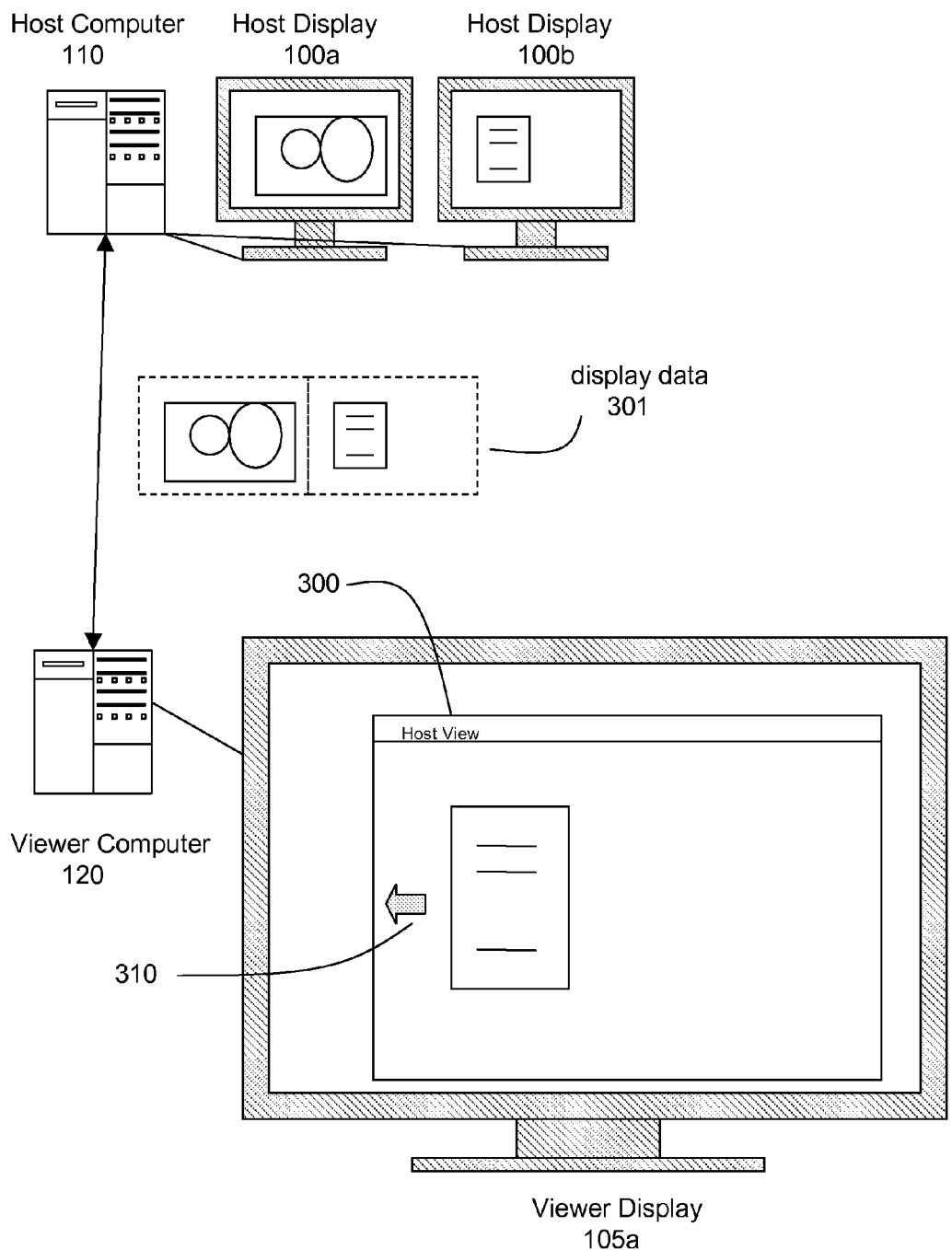
FIG. 3B is a second block diagram of one embodiment of a remote access system providing functionality for viewing screen data from multiple monitors.

Referring now to FIG. 3B, a second block diagram of one embodiment of a remote access system providing functionality for viewing screen data from multiple monitors is shown. In brief overview, a host computer 110 transmits graphical display data corresponding to a plurality of host displays 100. The graphical display data 301 comprises a list of rectangles, each rectangle corresponding to a given host display 100. The graphical display data is received by a viewer computer, and some or all of the graphical display data is then displayed in a window on the viewer display 105.

Still referring to FIG. 3B, the dedicated window 300 shows a representation of graphical data corresponding to the host display 100b. In the example shown, the indicator 310 indicates that the display of the host display 100a, which is not currently shown, exists to the left of the graphical data displayed in the window. If a user clicks on or otherwise activates the indicator 310, the dedicated window may transition to displaying the graphical data corresponding to the host display 100*b*, as is shown in FIG. 3B.

Figure 3C:
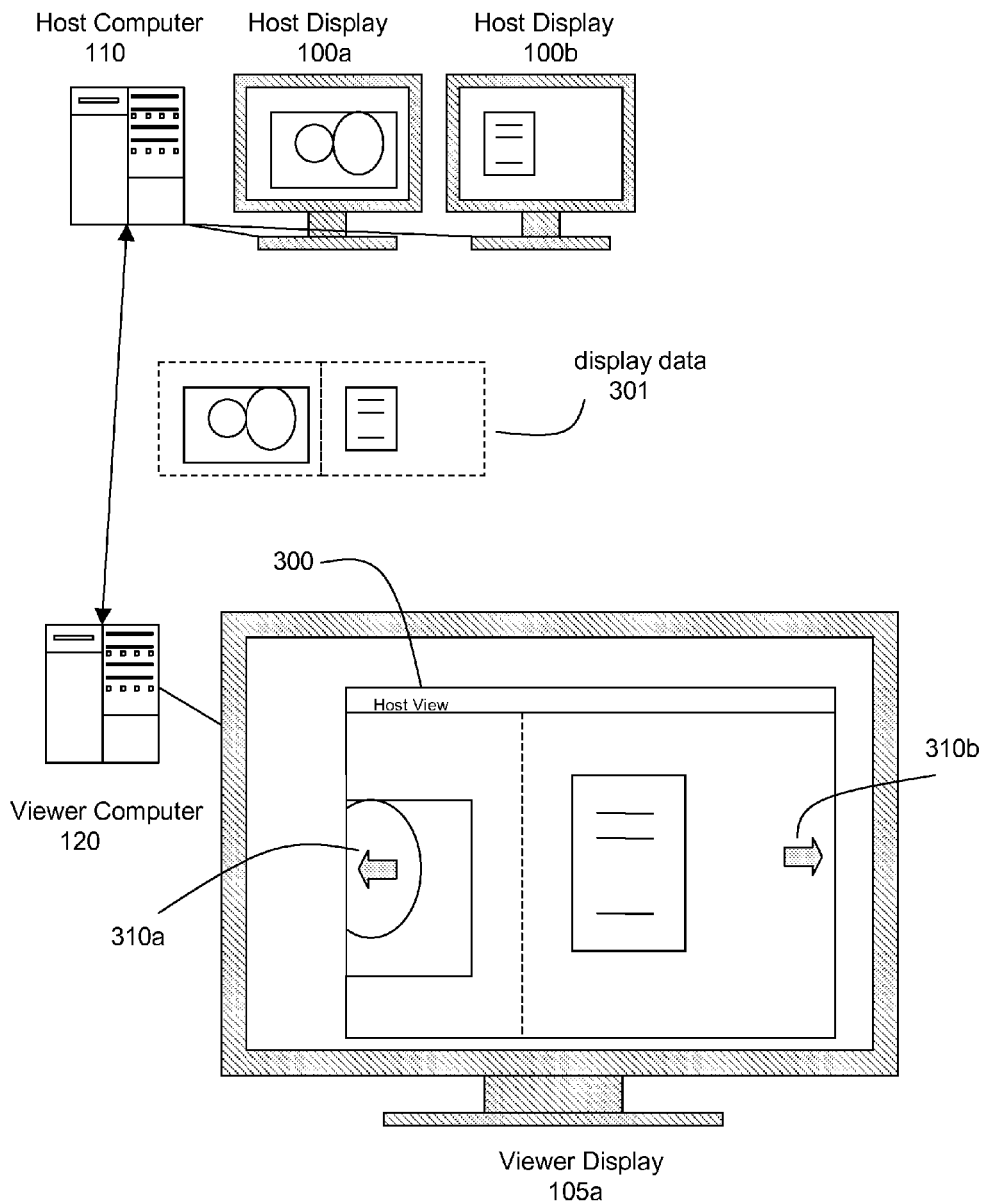
FIG. 3C is a second block diagram of one embodiment of a remote access system providing functionality for viewing screen data from multiple monitors.

Referring now to FIG. 3C a third block diagram of one embodiment of a remote access system providing functionality for viewing screen data from multiple monitors is shown. In brief overview, a host computer 110 transmits graphical display data corresponding to a plurality of host displays 100. The graphical display data 301 comprises a list of rectangles, each rectangle corresponding to a given host display 100. The graphical display data is received by a viewer computer, and some or all of the graphical display data is then displayed in a window on the viewer display 105.

Still referring to FIG. 3C, the dedicated window 300 shows a representation of graphical data corresponding to a portion of the host display 100*a* and a portion of the host display 100*b*. The window may provide functionality for the user to scroll between the two host displays, for example by moving a mouse pointer near an edge to which the user wishes to scroll. The window also comprises two indicators 310, each indicating the direction of undisplayed graphical data corresponding to a host display. In one embodiment, a user clicking on an indicator may cause the window to transition to displaying the dedicated window may transition to displaying the graphical data corresponding to the host display in the direction of the indicator. For example, a user clicking on the indicator 310*a* may transition the window to the display as shown in FIG. 3A, while a user clicking on the indicator 310*b* may transition the window to the display shown in FIG. 3B.

Figure 4:
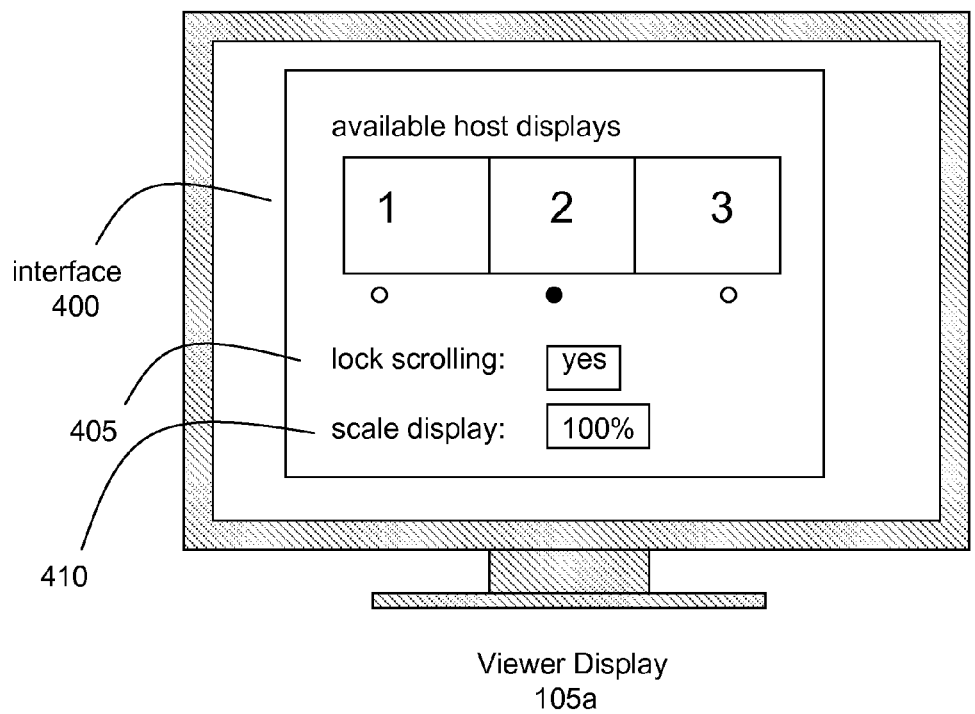
FIG. 4 is a block diagram of one embodiment of an interface including means for selecting a configuration for displaying a window representing screen data of a plurality of host displays in the viewable area of the one or more displays of a viewer computing device.

Referring now to FIG. 4, a block diagram of one embodiment of an interface including means for selecting a configuration for displaying a window representing screen data of the plurality of host displays in the viewable area of the one or more displays of the viewer computing device is shown. In brief overview, an interface 400 comprises input means for a user to select one or more displays to be shown. The interface also comprises input means for a user to select whether the window scrolling will be locked, and whether the received graphical data will be scaled in the window.

Still referring to FIG. 4, an interface 400 comprises input means for a user to select one or more displays to be shown. In the embodiment shown, a number of host displays may each be represented with a checkbox or button which allows the user to specify which displays the user would like to be shown in a dedicated window 300. In other embodiments, the input means may comprise a menu, slider, or button. In one embodiment, the input means may comprise a drag-and-drop interface wherein the user can drag one or more representations of host displays into a blank space representing the layout of the dedicated window 300.

An interface may also comprise an input for the user to specify whether scrolling will be locked. If a user specifies that scrolling is locked, a dedicated window 300 will not provide scrolling functionality, and the user may instead use indicators 310 to navigate among a plurality of host displays.

An interface 400 may also comprise an input for the user to specify whether one or more host displays will be scaled for display on a viewer display. In some embodiments, this input may be a feature of the drag-and-drop interface discussed above. For example, the user may be able to drag one or more representations of host displays into a blank space representing the layout of the dedicated window 300, and also resize the representations to indicate a scaling factor.

In some embodiments, the interface 400 may be displayed prior to the display of a window 300 displaying received graphical data 301. In other embodiments, the interface 400 may be displayed alongside a window 300 displaying received graphical data 301. For example, a separate window or widget may be provided which displays an overview of the host displays and the current configuration. A user may then click on the overview of a given host display to cause that given host display to be displayed in the dedicated window 300.

In some embodiments, an interface 400 may comprise functionality and inputs for a user to assign given host displays to given viewer displays. For example, if a host computer has three displays, and a viewer computer has two displays, the interface may allow a user to assign a first host display to the first viewer display, and a second host display to a second viewer display.

Figure 5:
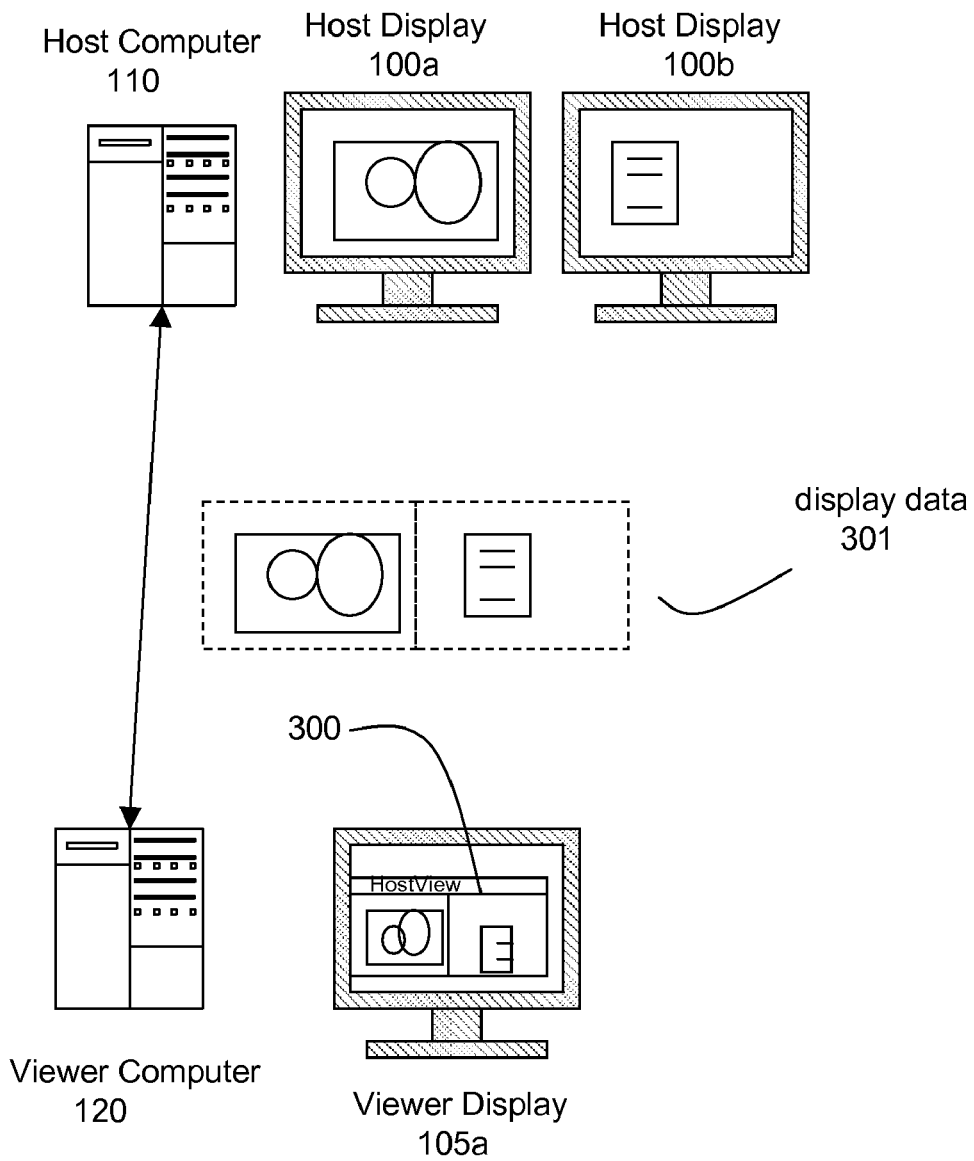
FIG. 5 is a block diagram of a one embodiment of a remote access system providing functionality for viewing scaled screen data from multiple monitors.

Referring now to FIG. 5, a block diagram of a one embodiment of a remote access system providing functionality for viewing scaled screen data from multiple monitors is shown. In brief overview In brief overview, a host computer 110 transmits graphical display data corresponding to a plurality of host displays 100. The graphical display data 301 comprises a list of rectangles, each rectangle corresponding to a given host display 100. The graphical display data is received by a viewer computer, and some or all of the graphical display data is then scaled and displayed in a window on the viewer display 105.

Still referring to FIG. 5, now in greater detail, the viewer display 105 comprises a window 300 which displays scaled graphical data corresponding to one or more host displays. The received graphical data may be scaled by any factor. In some embodiments, the received graphical data may be scaled such that it occupies a larger screen area. In some embodiments, the received graphical data may be scaled such that it occupies a smaller screen area. In some embodiments, the received graphical data corresponding to each of the host displays may be scaled by an equal factor. In other embodiments, the received graphical data corresponding to each of the host displays may be scaled by a plurality of different factors. For example, if a host computer had two displays, one significantly larger than the other, the received graphical data corresponding to the larger display may be scaled to occupy a larger screen area such that the graphical data appears to a viewer as it would on the host display.

In some embodiments, the viewer computing device may scale the graphical data such that it exactly occupies a given window size. In some embodiments, the viewer computing device may scale the graphical data such that the graphical data corresponding to a given host display exactly occupies a given window size. In other embodiments, the viewer computing device may scale the graphical data such that the graphical data corresponding to a given plurality of host displays exactly occupies a given window size Referring now to FIG. 6, a method of supporting multiple display configurations in a remote access environment is shown, wherein the remote access environment has a host computing device in communication with a plurality of host displays and a viewer computing device in communication with one or more viewer displays, the host computing device and viewer computing device in communication via a network. In brief overview, the method comprises: receiving from a host computing device, by a viewer computing device having one or more viewer displays, a list of rectangles, each rectangle representing the boundaries of one of a plurality of host displays (step 601); presenting, by the viewer computing device to an end-user of the viewer computing device, a graphical user interface including means for selecting a configuration for displaying a window representing screen data of the plurality of host displays in the viewable area of the one or more displays of the viewer computing device (step 603); and displaying in the selected configuration, by the viewer computing device, the window representing the screen data of the one or more host displays (step 605). The method may further comprise determining a host display is not currently shown in the window (step 607); displaying an indicator at an edge of the window, wherein the indicator provides an indication as to the direction of the host display that is not currently shown (step 609); and transitioning to the indicated display upon activation of the graphical indicator (step 611).

Figure 6:
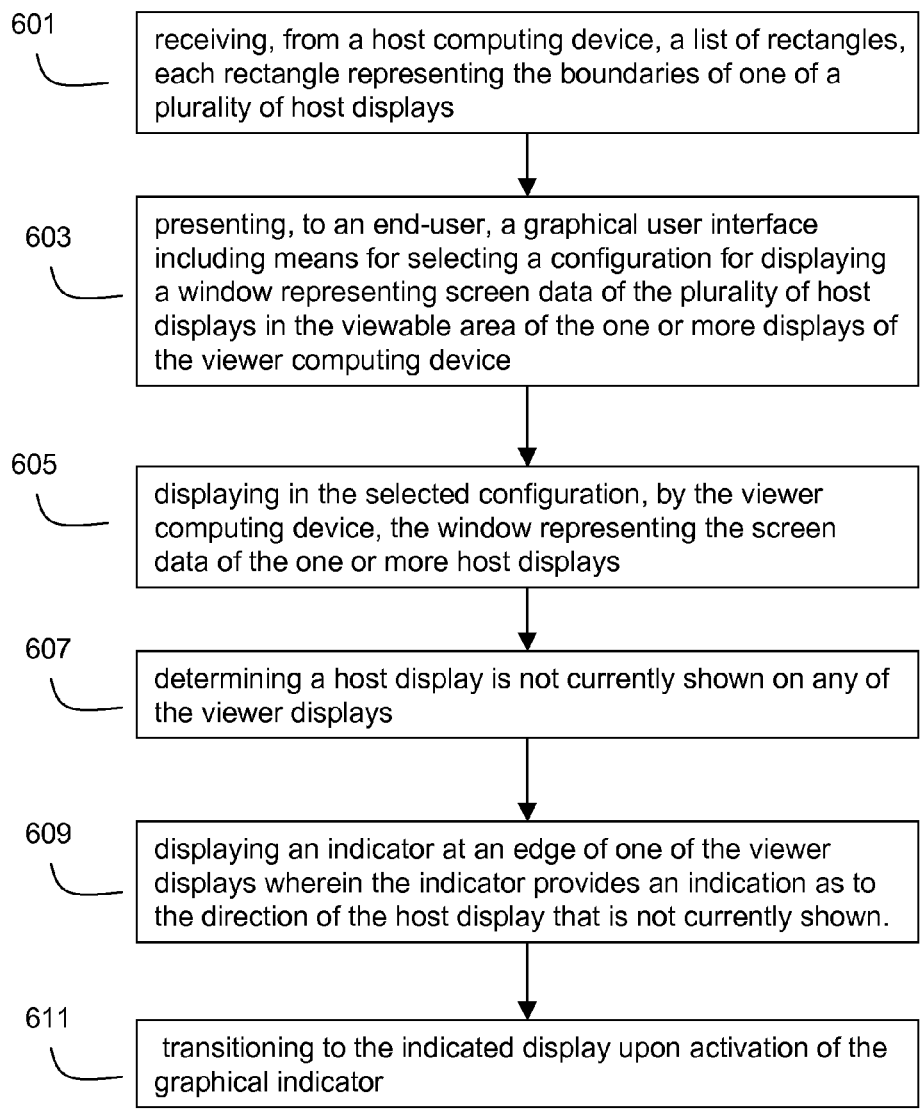
FIG. 6 is a flow diagram of a method of supporting multiple display configurations in a remote access environment.

Still referring to FIG. 6, now in greater detail, a viewer computing device having one or more viewer displays receives, from a host computing device, a list of rectangles, each rectangle representing the boundaries of one of a plurality of host displays (step 601). This step may be performed in accordance with any of the embodiments described herein. In some embodiments, the viewer computing device may comprise a single viewer display. In other embodiments, the viewer device may comprise a plurality of displays. In some embodiments, the host computing device may comprise two host displays. In still other embodiments, the host computing device may comprise three or more host displays.

In some embodiments, the list of rectangles may be received simultaneously to receiving graphical data corresponding to one or more host displays. In other embodiments, the list of rectangles may be received before or after receiving graphical data corresponding to one or more host displays.

The viewer computing device may present, to an end-user of the viewer computing device, a graphical user interface including means for selecting a configuration for displaying a window representing screen data of the plurality of host displays in the viewable area of the one or more displays of the viewer computing device (step 603). This interface may comprise any input means, including without limitation buttons, sliders, checkboxes, menus, drag-and-drop fields, and resizable boxes. A configuration may involve sizing, positioning, selecting, or otherwise adjusting the graphical representation of one or more host displays. In some embodiments, a user may be able to save and retrieve previously used or common configurations.

In some embodiments, the interface may be displayed before a window representing screen data is displayed. In other embodiments, the interface may be displayed during the display of a window representing screen data. In some embodiments, the interface may comprise a window or widget for selecting and configuring the display of one or more host displays. In some embodiments, the interface may comprise a button or indicator which allows a user to select one or more host displays for viewing.

The viewer computing device may then display, in the selected configuration, the window representing the screen data of the one or more host displays (step 605). In some embodiments, the window may be displayed on a single viewer display. In other embodiments, the window may be displayed on a plurality of viewer displays.

The viewer computing device may then determine a host display is not currently shown in the window (step 607). In some embodiments, this step may be performed by computing whether the graphical data corresponding to one or more of the received rectangles is not in the window. In some embodiments, the viewer computing device may determine that an entire host display is not currently shown in the window. In another embodiment, the viewer computing device may determine that a portion of a host display is not currently shown in the window.

The viewer computing device may display an indicator at an edge of the window, wherein the indicator provides an indication as to the direction of the host display that is not currently shown (step 609). This indicator may comprise any indicator described herein.

The viewer computing device may also transition to the indicated display upon activation of the graphical indicator (step 611). This step may be performed according to any of the embodiments described herein. In some embodiments, a viewer computing device may lock scrolling of the window upon a determination that one or more host displays are completely visible within the window.

While the invention has been particularly shown and described with reference to specific preferred embodiments, it should be understood by those skilled in the art that various changes in form and detail may be made therein without departing from the spirit and scope of the invention as defined by the appended claims.

I claim:

1. A method of supporting multiple display configurations in a remote access environment, the remote access environment having a host computing device in communication with a plurality of host displays and a viewer computing device in communication with one or more viewer displays, the host computing device and viewer computing device in communication via a network, the method comprising:
    (a) receiving from a host computing device that is in communication with a plurality of host displays, by a viewer computing device having one or more viewer displays, i) screen data for each of the plurality of host displays, and ii) a list of rectangles, each rectangle representing the boundaries of one of the plurality of host displays;
    (b) presenting, by the viewer computing device to an end-user of the viewer computing device, a graphical user interface for selecting a configuration to display the screen data of the plurality of host displays; and
    (c) displaying in the selected configuration, by the viewer computing device in a viewable area of the one or more displays of the viewer computing device, a window representing at least a portion of the screen data of the plurality of host displays.

2. The method of claim 1 wherein the viewer computing device comprises a plurality of viewer displays, and wherein step (c) comprises displaying in the selected configuration, by the viewer computing device in at least two of the plurality of viewer displays, the window representing at least a portion of the screen data of the plurality of host displays.

3. The method of claim 2 wherein the plurality of host displays comprises the same number of displays as the plurality of viewer displays.

4. The method of claim 2 further comprising the steps of:
    (d) determining that a host display is not currently shown in the window; and
    (e) displaying an indicator at an edge of the window, wherein the indicator provides an indication as to the direction of the host display that is not currently shown.

5. The method of claim 1 further comprising
    (d) displaying a graphical user interface means for selecting one of the plurality of host displays for viewing; and
    (e) constraining navigation of the window representing the screen data of the plurality of host displays to a currently selected one of the plurality of host displays.

6. The method of claim 5 further comprising the step of:
    displaying an indicator at an edge of the window wherein the indicator provides an indication as to the direction of a host display that is not currently shown.

7. The method of claim 1 wherein the viewer computing device comprises a single viewer display, and wherein step (c) comprises displaying in the selected configuration, by the viewer computing device in the single viewer display, a window representing the screen data of a selected one of the plurality of host displays.

8. The method of claim 7 further comprising the step of presenting a graphical indicator at an edge of the window to indicate the ability to transition to another of the host displays not presently shown on the viewer display.

9. The method of claim 7 further comprising the step of presenting a graphical indicator at an edge of the window to indicate the ability to transition to another of the host displays not presently shown on the viewer display, wherein another of the host displays exists in the direction of the indicator.

10. The method of claim 8 further comprising the step of transitioning to the indicated display upon activation of the graphical indicator.

11. The method of claim 1 wherein the viewer computing device has one viewer display and further comprising the step of scaling the screen data of each of the host displays such that the screen data for each host display is displayed on the viewer display.

12. A computer implemented system for supporting multiple display configurations in a remote access environment, the remote access environment having a host computing device in communication with a plurality of host displays and a viewer computing device in communication with one or more viewer displays, the host computing device and viewer computing device in communication via a network, the system comprising:
  a viewer computing device having one or more viewer displays, the viewer computing device comprising:
    a transceiver which receives, from a host computing device that is in communication with a plurality of host displays, i) screen data for each of the plurality of host displays, and ii) a list of rectangles, each rectangle representing the boundaries of one of the plurality of host displays; and
    one or more viewer displays which displays i) a graphical user interface for selecting a configuration to display the screen data of the plurality of host displays, and ii) in the selected configuration, a window representing at least a portion of the screen data of the plurality of host displays.

13. The system of claim 12 wherein the viewer computing device comprises a plurality of viewer displays, and wherein the plurality of viewer displays display, in at least two of the plurality of viewer displays, the window representing at least a portion of the screen data of the plurality of host displays.

14. The system of claim 13 wherein the plurality of host displays comprises the same number of displays as the plurality of viewer displays.

15. The system of claim 13 wherein the viewer computing device further comprises a processor which determines that a host display is not currently shown in the window; and wherein a viewer display displays an indicator at an edge of the window that provides an indication as to the direction of the host display that is not currently shown.

16. The system of claim 12 wherein a viewer display displays a graphical user interface means for selecting one of the plurality of host displays for viewing; and
  wherein the viewer computing device constrains navigation of the window representing the screen data of the plurality of host displays to a currently selected one of the plurality of host displays.

17. The system of claim 16 wherein a viewer display displays an indicator at an edge of the window that provides an indication as to the direction of a host display that is not currently shown.

18. The system of claim 12 wherein the viewer computing device comprises a single viewer display, and wherein the viewer display displays a window representing the screen data of a selected one of the plurality of host displays.

19. The system of claim 18 wherein the viewer display displays a graphical indicator at an edge of the window to indicate the ability to transition to another of the host displays not presently shown on the viewer display.

20. The system of claim 18 wherein the viewer display displays a graphical indicator at an edge of the window to indicate the ability to transition to another of the host displays not presently shown on the viewer display, and wherein another of the host displays exists in the direction of the indicator.

21. The system of claim 20 wherein the viewer display displays the indicated display upon activation of the graphical indicator.

22. The system of claim 12 wherein the viewer computing device comprises a single viewer display, and wherein the viewer computing device scales the screen data of each of the host displays such that the screen data for each host display is displayed on the viewer display.

* * * * *